May 12, 1931.  A. SCHUMACKER  1,804,708
THREAD CUTTING MACHINE
Filed June 2, 1927
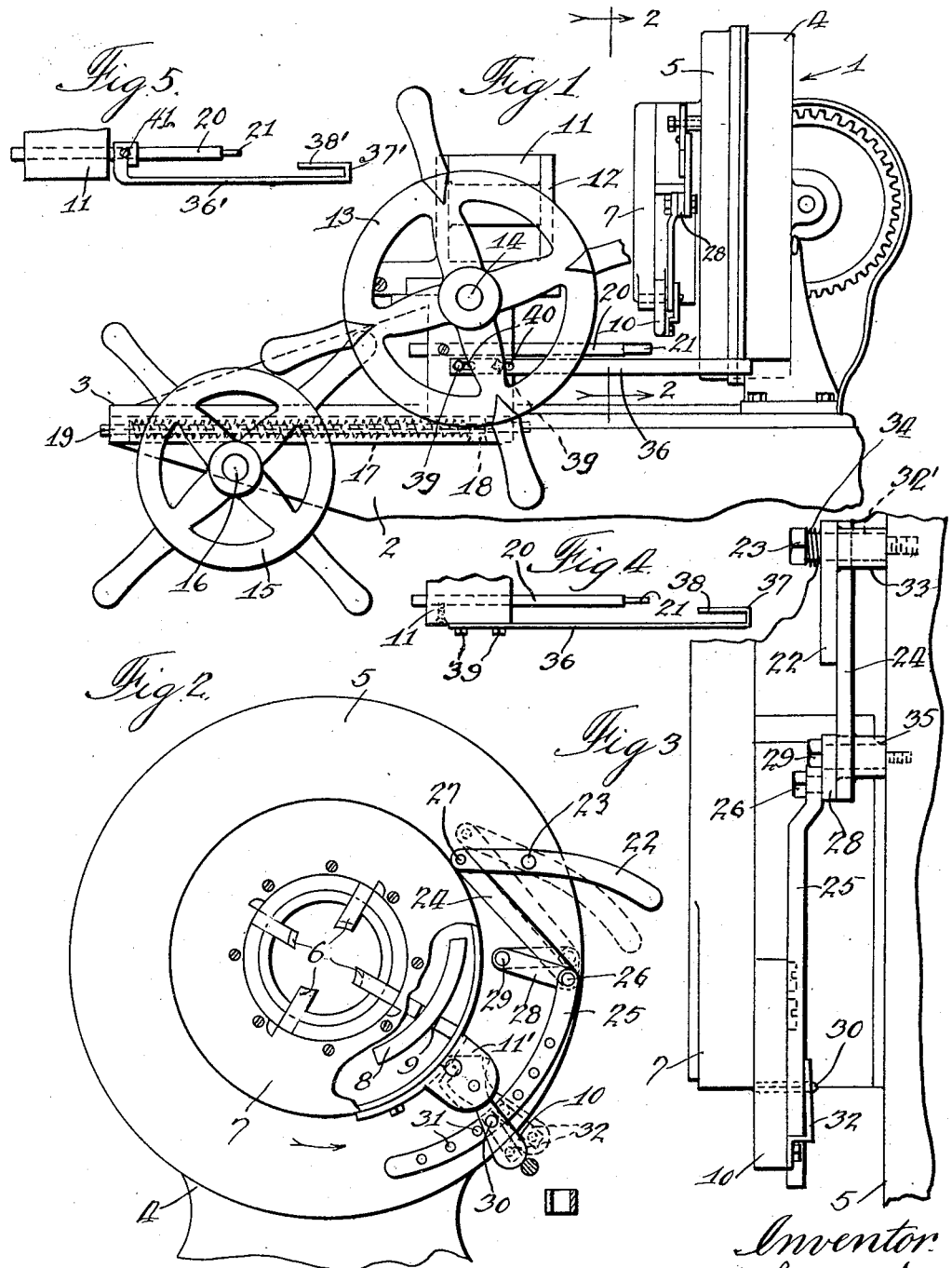

Patented May 12, 1931

1,804,708

UNITED STATES PATENT OFFICE

ANTONE SCHUMACKER, OF CHICAGO, ILLINOIS

THREAD CUTTING MACHINE

Application filed June 2, 1927. Serial No. 195,998.

This invention relates to thread cutting machines and die-setting or closing and releasing mechanisms therefor, which are adapted to be used for cutting threads on pipes, bolts or screws, or other articles on which helical threads are to be cut, and more particularly to pipe-threading machines, and attachments for setting or tightening the thread-cutting dies, and for permitting the releasing or loosening of the same from cutting engagement with the threads automatically and without the necessity of stopping the rotation of the die-stock or rotative die-supporting head.

The principal object of the invention is to provide a simple, economical and efficient thread-cutting machine and die-setting or closing and releasing mechanism therefor, comprising means for automatically setting or closing the thread-cutting dies, and means for automatically loosening the same from cutting engagement with the threads during the rotation of the die-supporting head or without the necessity of stopping the rotation of the same.

Other and further objects of the invention will appear from the following description and claims, and from an inspection of the accompanying drawings, which are made a part hereof.

The invention consists in the features, combinations and details of construction and arrangement of parts herein described and claimed.

In the accompanying drawings—

Figure 1 is a view in side elevation of part of a thread-cutting machine or pipe-threading machine comprising a rotative die-stock or die-supporting head, a movable work-supporting vice or pipe-supporting and clamping member, and means for operating said parts, provided with means for automatically setting or closing and releasing the thread-cutting dies, in accordance with my invention;

Fig. 2 is an enlarged view in front elevation of the rotative die-supporting head, showing my improved means for setting or closing and releasing the thread-cutting dies in accordance with my invention;

Fig. 3 is an enlarged detail view in side elevation of a portion of the rotative die-stock or head, showing my improved die-closing or setting mechanism, with parts of the head omitted;

Fig. 4 is a detail plan view of the tripping mechanism on the work-supporting or pipe-supporting vice or carriage, for tripping the mechanism on the rotative die-supporting head, to set or close and loosen or release the thread-cutting dies in accordance with my invention; and Fig. 5 is a modification of the tripping mechanism, one form of which is shown in said Fig. 4.

In constructing a thread-cutting machine provided with a die-setting or die-closing attachment or mechanism adapted to enable the dies to be automatically set or closed, and loosened or released in accordance with my invention and while the dies and rotative die-stock or head are rotating, or without the necessity of stopping the rotation of the same, I provide a pipe-threading or thread-cutting machine 1 having a frame 2 and a horizontal track or bed 3. A stationary head 4 is supported on the frame; and a rotative die-supporting head or die-stock 5 is supported on the stationary head and operatively connected with suitable driving mechanism, for rotating the same, all of which may be of any desired ordinary and well known or suitable form.

Toothed thread-cutting dies 6 are mounted on and adapted to be adjusted radially with respect to the rotative die-stock or head 5 by means of a die-setting and holding cam 7 which is supported on and in rotative relation to the die-stock or rotative die-supporting head 5 and may be provided with the usual die-engaging cam members 8 in engagement with the notched portions 9 of the thread-cutting dies, for spreading and adjusting the dies toward and from the center of the rotative die-supporting head or die stock by the partial rotation of the cam 7 relatively to the die-supporting head. A die-closing and loosening or releasing lever 10 is pivotally mounted on the rotative die stock or head 5, and is operatively connected with the rotative cam 7 and the projecting boss 11' on the cam 7, and through the medium of said boss and cam, with the cutting dies 6. The lever 10 is adapted to operate the cam to set or close the dies 6, by moving the said lever in one direction on its pivotal support or axis. Said lever 10 is adapted to be moved in an opposite direction on its pivot or axis, to operate the cam and release the dies from cutting engagement with the threads or work.

A movable work-supporting vice or carriage 11 having the usual pipe-engaging and releasing clamping jaws 12, is slidably mounted on the track 3, and provided with suitable means for opening and closing said clamping jaws, such, for example, as a hand wheel 13 on and rotative with a transverse clamping screw 14.

Suitable means is provided for moving the vice or carriage 11, with the work supported thereon, toward and from the rotative die-supporting head or die-stock 5. For example, a hand wheel 15 may be fixed to a rotative transverse stub shaft 16 mounted in suitable bearings in the machine frame 2 and operatively connected with the vice or carriage 11 by means of rack and pinion mechanism or other suitable connecting means not shown. And a spring 17 is operatively connected with the slidable vice or carriage 11 and is adapted to automatically move the same, and the work supported thereon, in one direction, or away from the rotative die-supporting head or die-stock 5 when the thread-engaging ends of the thread-cutting dies 6 are withdrawn or loosened from cutting engagement with the threads on the pipe or "work" carried by the vice. One end of the spring 17 may be in engagement with the work-supporting carriage or vice 11, and the other end in engagement with a boss or stationary projection 18 on the frame 2, the spring being connected with the vice or work-supporting carriage by means of a bolt 19 on the latter, or equivalent means, whereby the spring is adapted to tend to press the vice or carriage 11, away from the rotative die-stock or head 5, so as to withdraw the vice and the work supported thereon, from the thread-cutting dies and rotative die stock whenever the dies are loosened or released from cutting engagement with the threads on the pipe or "work".

Tripping means is provided, for tripping the die-releasing lever 10, to loosen or release the thread-cutting dies 6 from engagement with the threads on the pipe or work whenever the thread has been cut to the desired length or number of turns on the pipe. This tripping means may be in the form of a tripping rod or finger 20 on and, by preference, adjustable with respect to the vice or work supporting carriage 11. The rod or tripping finger 20 may be mounted on the vice 11 and in position to project toward the rotative die-stock or head 5, the projecting end 21 of said rod being between the vice and the rotative die-stock and in position to move with the vice into and out of the path of movement of the outer extremity of the die-releasing lever 10, to trip the said lever and thereby release or loosen the thread-cutting dies from engagement with the thread when the thread has been cut to the desired length, thus releasing and permitting the vice 11 to be moved away from the rotative die-stock 5 and cutting dies, and to carry the pipe or work on which a thread has been cut, away from and out of engagement with the dies, thus leaving the dies free to be moved inward toward the center of the die-stock and axis of rotation of the dies, to the proper operative position, for engaging and cutting a thread on another pipe, or article to be clamped in the vice or supported on and carried by and with the vice or carriage 11 into position to be engaged and operated on by the thread-cutting dies. The tripping rod 20 may be moved to different adjusted positions on the vice, thus controlling the length of the thread to be cut, by adjusting the tripping end 21 forward or backward on or with respect to the vice—toward the rotative die-stock to shorten the thread to be cut, and toward the vice and away from the rotative die-stock or head, to lengthen the thread to be cut.

In the operation of moving the dies outward radially to automatically loosen them from their cutting engagement with the work, the outer end of the lever 10 is moved on its axis in a direction opposite to the direction of rotation of the rotative die-stock or head 5. And in the form of device herein shown and described, I have provided means, including lever and tripping mechanism, operatively connected with and adapted to automatically trip and actuate said outer end of the lever 10 on its axis in the same direction in which the rotative die-stock is rotating, for moving the thread-cutting dies inward and automatically setting them in their closed or operative thread-cutting position during the rotation of the die-stock or rotative die-supporting head.

A tripping lever 22 is pivotally supported upon the rotative die-stock or head 5 by means of a pivot 23, and operatively connected with the lever 10, already described, by suitable connecting mechanism, such, for example, as a pair of connecting link members 24 and 25 having overlapping ends which are flexibly connected by means of a pivot pin 26, one end of the link or connecting rod 24 being connected with the inner end of the tripping lever 22 by means of a pivot pin 27, and a pivoted rocking arm or lever 28 being mounted on and pivotally connected with the rotative die-stock 5 by means of a pivot pin 29 and pivotally connected with the opposite end of said link 24 and the adjacent end of the link 25 by the pin 26. The connecting link or rod 25 is flexibly or pivotally connected with the lever 10, by means of a pin 30 which is anchored in the lever 10 and adapted to extend into and to be secured in engagement with any desired hole 31 in the perforated link or connecting rod 25 which is provided with a series of holes 31 adapted to permit any necessary adjustment to be made of the connection between the parts 25 and 10. A spring 32 on the lever 10 serves to releasably engage the pin 30 and connecting link or rod 25, and to prevent the parts connected by the pin 30 and said spring from becoming accidentally disconnected. A sleeve or bushing 32' within the boss 33 on the lever 22, encircles the headed pin 23; and said pin is provided with a compression spring 34 which is interposed between the head of the pin and the lever 22, and encircles the pin. And the rocking arm 28 has a projecting boss 35 thereon which is provided with a perforation adapted to admit the shouldered or enlarged body portion of the pin 29, thus affording a connection which will permit the desired freedom of movement between the connected parts and prevent binding.

A tripping member, which may be in the form of a rod 36 having an angular or hooked end portion 37 the inner extremity 38 of which is adapted to be moved with the vice 11 into and out of the path of movement of the outer extremity of the tripping lever 22, is mounted, by preference adjustably, on the vice or work-supporting carriage 11, to which said tripping rod 36 is attached by any desired or suitable securing means, such, for example, as a pair of headed screws 39, 39 anchored in the vice 11 and adapted to extend through elongated openings 40, 40 in the vice 11.

In Fig. 5 is shown a modified form of tripping device, in which a tripping rod 36', which corresponds with the tripping rod 36 already described, is adjustably mounted upon the tripping rod 20, which is, in turn, supported on the movable vice or work-supporting carriage 11. The tripping rod 36' has an angular or hooked end portion 37', the inner extremity 38' of which is movable with the vice, into and out of tripping position with respect to the die-closing trip lever 22; and the end 21 of the tripping rod 20 is movable into and out of position to engage and trip the die-releasing lever 10, as already described.

A set screw 41 in threaded engagement with a suitable opening in the tripping member 36' and having the inner end of said screw in position to engage and release the tripping rod 20, serves to hold the tripping member 36' in any position to which the latter may be adjusted on or with respect to said tripping rod 20.

From the foregoing, it will be readily understood by those skilled in the art that, in addition to permitting the tripping rod 20 to be automatically moved into and out of the path of movement of the die-releasing lever 10, for tripping said lever 10, to release the dies from cutting engagement with the pipe or work, as in ordinary machines, applicant's improved device provides means for automatically operating the die-releasing and setting lever 10 in an opposite direction during the rotation of the die-stock or head 5, by automatically moving the tripping rod 36, into the path of movement of the die-closing or die-setting tripping lever 22, for automatically closing or setting the dies in their proper operative position for cutting a thread upon a pipe or the like, carried by the vice 11. The tripping rod 20 is moved automatically into position to engage and trip the lever 10, for releasing the thread-cutting dies at the moment when the thread has been completed. Upon the releasing of the dies from engagement with the finished thread, the vice 11 with the pipe or work carried thereby, is moved away from the rotative die-stock or head; and the same movement of the vice, thus caused by the spring 17, will carry the tripping end 38 of the tripping rod 36 into the path of movement of the lever 22, thus causing the latter to operate the lever 10 in the direction necessary to close or set the dies automatically while the die-stock or rotative die-supporting head is rotating and while the machine is in operation, and without stopping the machine either to release or set the dies.

I claim:

1. In a thread-cutting machine having a rotative die-supporting head, thread-cutting dies on and rotative with said head, and movable work-supporting and feeding means, the combination of die-setting and releasing lever pivotally supported on and rotative with said head, a cam mounted on and in rotative relation to said head and in engagement with said die-setting and releasing lever and dies and forming a connection between the same, means operatively connected with said work-supporting and feeding means and adapted to engage said die-setting and releasing lever on said head, for releasing the dies, and means operatively connected with and adapted to be operated by said movable work-supporting and feeding means, for automatically setting the thread-cutting dies in thread-cutting position in the rotative head.

2. In a thread-cutting machine having a rotative die-supporting head, thread-cutting dies on and rotative with said head, and movable work-supporting and feeding means, the combination of a die-setting and releasing lever pivotally mounted on said head and operatively connected with the dies, tripping means operatively connected with said work-supporting and feeding means and movable into and out of engagement with said die-setting and releasing lever on said head, for tripping said lever to release the dies, tripping lever mechanism on said rotative head and operatively connected with said first-mentioned lever, for actuating the same, to set the dies in operative-thread-cutting position in the head, and means associated with said work-supporting and feeding means, for operating said last-mentioned tripping lever mechanism on the head, for automatically setting the dies in thread-cutting position.

3. In a thread-cutting machine, the combination of a frame, a rotative die-supporting head on said frame, thread-cutting dies mounted on and rotative with said head, movable work-supporting means mounted on said frame and movable toward and from the die-supporting head, a die-setting and releasing lever pivotally mounted on and rotative with said die-supporting head, means for operatively connecting said lever with the dies, tripping means on and movable with said work-supporting means and adapted to engage and operate said lever in one direction on its axis, for releasing the dies from cutting engagement with the work, lever-operating means on said rotative head and operatively connected with said die-setting and releasing lever, for operating the same in an opposite direction on its axis, to set the dies in operative thread-cutting position, and tripping means on and movable with said movable work-supporting means into and out of tripping-engagement with said lever-operating means on said rotative head, for operating the same during the rotation of the head.

4. In a thread-cutting machine having a rotative die-supporting head, thread-cutting dies on and rotative with said head, and movable work-supporting and feeding means including a work-supporting clamping member adapted to be moved toward and from the rotative die-supporting head, the combination of a die-setting and releasing lever pivotally mounted on said rotative head and operatively connected with the dies, tripping means operatively connected with said work-supporting and feeding means and movable with said work-supporting clamping member into and out of tripping engagement with said die-setting and releasing lever on said head, for releasing the thread-cutting dies, a second tripping lever pivotally mounted on and rotative with said die-supporting head and having inner and outer lever arms, means for operatively connecting the inner lever arm of said second tripping lever with said first-mentioned die-setting and releasing lever, and tripping means operatively connected with and adapted to be operated by said work-supporting and feeding means, for operating said outer arm of said second tripping lever, to automatically set the thread-cutting dies in operative thread-cutting position during the rotation of the die-supporting head.

Signed at Chicago, in the county of Cook and State of Illinois, this 24th day of May, 1927.

ANTONE SCHUMACKER.